United States Patent
Kojima et al.

(10) Patent No.: US 8,196,283 B2
(45) Date of Patent: Jun. 12, 2012

(54) METHOD FOR MANUFACTURING AN AXIAL AIR-GAP ELECTRONIC MOTOR

(75) Inventors: Tomonori Kojima, Kawasawki (JP);
Toshiaki Tanno, Kawasaki (JP);
Yoshikazu Tanaka, Kawasaki (JP);
Yoichi Tanabe, Kawasaki (JP);
Hirokazu Matsuzaki, Kawasaki (JP);
Masaki Yamada, Kawasaki (JP);
Masanori Murakami, Kawasaki (JP)

(73) Assignee: Fujitsu General Limited, Kawasaki-Shi (JP)

( * ) Notice: Subject to any disclaimer, the term of this patent is extended or adjusted under 35 U.S.C. 154(b) by 547 days.

(21) Appl. No.: 12/382,263

(22) Filed: Mar. 12, 2009

(65) Prior Publication Data

US 2009/0173817 A1 Jul. 9, 2009

Related U.S. Application Data

(62) Division of application No. 11/336,978, filed on Jan. 23, 2006.

(30) Foreign Application Priority Data

Jan. 24, 2005 (JP) ................................. 2005-016076
Jul. 29, 2005 (JP) ................................. 2005-220627

(51) Int. Cl.
*H02K 15/00* (2006.01)
(52) U.S. Cl. .............. 29/596; 29/598; 29/605; 242/432; 242/432.6; 242/445
(58) Field of Classification Search .................... 29/596, 29/598, 605, 732; 242/432, 432.6, 445; 310/194, 310/216.098, 216.105, 254.1
See application file for complete search history.

(56) References Cited

U.S. PATENT DOCUMENTS 6,941,644 B2 * 9/2005 Shteynberg et al. ............. 29/605

* cited by examiner

*Primary Examiner* — Thiem Phan
(74) *Attorney, Agent, or Firm* — Manabu Kanesaka

(57) ABSTRACT

In a method for manufacturing an axial air-gap electronic motor, a plurality of core member and a plurality of dummy members are prepared, wherein each of the dummy members has a shape same as that of the core members. Then, the plurality of core members is arranged such that teeth surfaces of the core members face each other, and the dummy member is arranged between predetermined core members. Thereafter, a coil is wound from one end side toward the other end side of the core members through the dummy member continuously without cutting. A part of the coil corresponding to a transition wire set between the core members is wound on the dummy member.

6 Claims, 13 Drawing Sheets

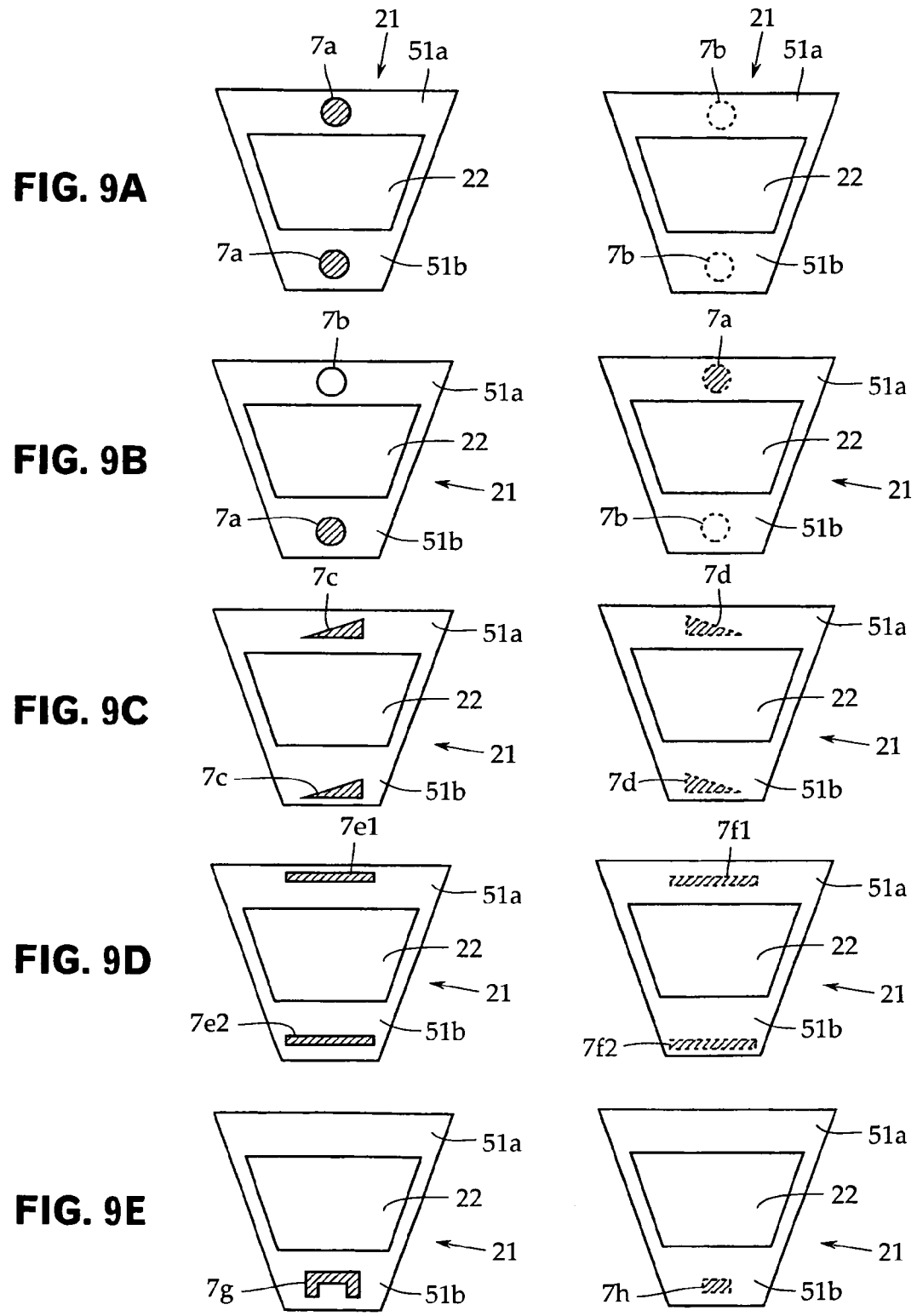

METHOD FOR MANUFACTURING AN AXIAL AIR-GAP ELECTRONIC MOTOR

CROSS REFERENCE TO RELATED APPLICATION

This is a divisional application of patent application Ser. No. 11/336,978 filed on Jan. 23, 2006.

BACKGROUND OF THE INVENTION AND RELATED ART STATEMENT

The present invention relates to a method for manufacturing an axial air-gap electronic motor. More particularly, it relates to a technique for assembling an axial air-gap electronic motor in which a stator is formed by a plurality of core members.

For example, as shown in Patent Document 1 (Japanese Patent Application Publication No. 2004-282989), an axial air-gap electronic motor is configured so that a rotor is arranged oppositely on one or both of side surfaces of a stator with a predetermined gap therebetween, and is characterized in that the thickness thereof in the rotating shaft direction can be reduced, namely, can be made flat as compared with a radial gap electronic motor of an inner rotor type etc.

Also, since the facing area of the rotor and the stator and the winding occupying rate of a coil are improved, the magnetic flux is directed in the axial direction, so that high efficiency and high output can be achieved.

The axial air-gap electronic motor described in Patent Document 1 is constructed so that the stator is formed by joining a plurality of fan-shaped core members in a ring form. According to this construction, a coil is wound on one core member in advance, and the core members are joined in a ring form and wired, by which the stator can be formed easily.

However, in such a stator construction, since each core member, which has conventionally been in a separate state, is set on a wire winding device one by one so that a coil is wound thereon, the work for preparing core members necessary for assembling one stator requires much labor and time.

Also, after the coil has been wound on the core member, the coil pulled out of each core member for each phase must be connected, which presents a problem in that wire connecting work and transition wire processing also require much labor and time.

Further objects and advantages of the invention will be apparent from the following description of the invention.

SUMMARY OF THE INVENTION

The present invention has been made to solve the above-described problems, and accordingly an object thereof is to shorten the wire winding time of a core member and to reduce the assembling manpower in an axial air-gap electronic motor in which a stator is formed by a plurality of core members.

To achieve the above object, the present invention is provided with some features described below. In an axial air-gap electronic motor in which a teeth surface of a stator and a magnet surface of a rotor are arranged oppositely along the axis line direction of an output shaft of the rotor with a predetermined gap being provided therebetween, the stator has a plurality of core members connected in a ring form with the axis line being a center, and each of the core members is provided with a connecting means for connecting the teeth surfaces to each other in an opposed state.

According to this feature, since the connecting means for connecting the teeth surfaces to each other in an opposed state is provided, a coil can be wound at a time from one side toward the other side of the core members in a state in which the core members are connected in a one-row rod form.

As a preferable mode, the core member is formed into a bobbin shape including a stator iron core, and the connecting means is provided on the outer periphery side and/or the inner periphery side of a flange portion of the core member.

According to this feature, since the connecting means is provided on the outer periphery side and/or the inner periphery side of the flange portion, the core members can easily be connected to each other by merely causing the flange portions to face to each other.

Also, when one teeth surface of the core member is called a first teeth surface and the other teeth surface is called a second teeth surface, the connecting means is provided so that the first teeth surface and the second teeth surface, the first teeth surfaces, and the second teeth surfaces of two adjacent core members can be connected to each other.

According to this feature, since the first teeth surface and the second teeth surface, the first teeth surfaces, and the second teeth surfaces can be connected to each other, after the coil has been wound at a time, the core members can be assembled by being divided for each phase, or the core members can be assembled separately. Various assembling methods corresponding to the wire winding direction can be used.

As a preferable mode, the connecting means consists of a rib pair which is shifted relatively in the circumferential direction or the radial direction of the stator in the flange portion. Further preferably, the rib pair is provided at a position where the relative rotation of the core member is restrained by fitting the rib pairs to each other.

According to this feature, by engaging the ribs formed in the flange portions with each other, not only the positioning of the core member can be performed easily but also the core member can be prevented from shifting in the rotation direction when the coil is wound.

Also, the connecting means consists of an engagement portion including a convex portion formed in one flange portion and a concave portion formed in the other flange portion, and is provided at a position where the convex portion and the concave portion coincide relatively with each other.

According to this feature, by engaging the concave portion and the convex portion provided in the flange portions with each other in a male-female engagement manner, the core members can be positioned easily with respect to each other.

Further, either one of the flange portions of the core member is provided with a locking claw serving as the connecting means, and the other of the flange portions of the adjacent core members is connected by the locking claw.

According to this feature, even if the locking claw is provided at a part of the flange portion to hook and hold the other flange portion, the same operation and effects can be obtained.

Further, in an axial air-gap electronic motor in which a teeth surface of a stator and a magnet surface of a rotor are arranged oppositely along the axis line direction of an output shaft of the rotor with a predetermined gap being provided therebetween, the stator has a plurality of core members connected in a ring form with the axis line being a center, a winding is placed by dividing the core members for each phase, and the winding consists of one continuous winding.

According to this feature, the winding is placed by dividing the core members for each phase, so that one winding can be wound without being cut, and assembling can also be performed.

The present invention provides a method for manufacturing an axial air-gap electronic motor. In a method for manufacturing an axial air-gap electronic motor in which a teeth surface of a stator and a magnet surface of a rotor are arranged oppositely along the axis line direction of an output shaft of the rotor with a predetermined gap being provided therebetween, the stator has a plurality of core members connected in a ring form, and the method has a connecting step in which the core members are connected in a state in which the teeth surfaces thereof face to each other; a winding step in which the coil is wound successively from one end side to the other end side of the connected core members; and an assembling step in which the core members on which the coil is wound are connected in a ring form.

According to this feature, first, the core members are connected in a rod form in a row, and then the coil is wound from one core member toward the other core member and the core members are connected in a ring form. Thereby, not only the coil winding processing can be reduced but also the assembling manpower can be reduced.

As a preferable mode, in the connecting step, the core members are connected by being divided for each phase. Further preferably, the stator includes nine core members, and the core members are connected by making three core members of each phase one group.

According to this feature, nine core members are divided into three groups of three core members of U phase, V phase, and W phase and are connected in a rod form, by which the coil can be wound in one turn without being cut for each phase.

Also, preferably, in order to cause the adjacent core member to have a different pole, the core members are preferably connected by being turned round alternately. Further preferably, in order to cause the adjacent core member to have a different pole, the winding directions of core members at both ends are reversed with respect to the winding direction of the core member having the different pole.

According to this feature, the core members at both sides are connected by being turned round with respect to the core member having the different pole, by which the adjacent core member can be caused to have a different pole without cutting the coil.

Also, in the winding step, the coil is wound from one end side to the other end side of the core members at a time without being cut.

According to this feature, since the coil is wound from one end side to the other end side of the connected core members at a time without being cut, the assembling step can be made high in speed and simple.

As another mode of the present invention, in a method for manufacturing an axial air-gap electronic motor in which a teeth surface of a stator and a magnet surface of a rotor are arranged oppositely along the axis line direction of an output shaft of the rotor with a predetermined gap being provided therebetween, the stator has a plurality of core members connected in a ring form; and after the teeth surfaces of the core members have been arranged so as to face to each other and a dummy member has been arranged between predetermined core members, a coil is wound from one end side toward the other end side of the core members continuously without being cut, and a coil of a length corresponding to a transition wire set between the core members is wound on the dummy member.

According to this feature, the coil of an amount necessary for the transition wire of core members of each phase is wound on the dummy member. Thereby, even in a type such that the core members of U phase, V phase, and W phase are laid out in a form of stepping stones in the order of U→V→W→U→V→W→U→V→W, the transition wire can be formed at the same time.

Preferably, in the case where the slot combination of the rotor and the stator is 2n:3n (n is a positive integer), the dummy member is interposed every other core member. Further preferably, in the case where the slot combination of the rotor and the stator is 8n:9n or 10n:9n (n is a positive integer), the dummy member is interposed every third core member.

According to this feature, in the case where the slot combination of the rotor and the stator is 2n:3n (n is a positive integer), the dummy member is interposed every other core member, and in the case where the slot combination is 10n:9n (n is a positive integer), the dummy member is interposed every third core member. Thereby, the transition wire can be formed.

As still another mode, in a method for manufacturing an axial air-gap electronic motor in which a teeth surface of a stator and a magnet surface of a rotor are arranged oppositely along the axis line direction of an output shaft of the rotor with a predetermined gap being provided therebetween, the stator has a plurality of core members connected in a ring form; after the core members have been arranged so that the teeth surfaces thereof face to each other and a coil has been wound continuously without being cut from one end side toward the other end side of the core members, a transition wire set between the core members is cut; and after the core members have been connected in a ring form, the transition wires are connected to each other for each phase.

According to this feature, after all of the core members have been connected to each other on a straight line and the coil has been wound at a time, the core members are formed by cutting the coil, by which after the core members have been connected in a ring form, the coils can be connected.

BRIEF DESCRIPTION OF THE DRAWINGS

FIGS. 9A to 9E are schematic views showing various modifications of connecting means;

DETAIL DESCRIPTION OF PREFERRED EMBODIMENTS

Figure 1:
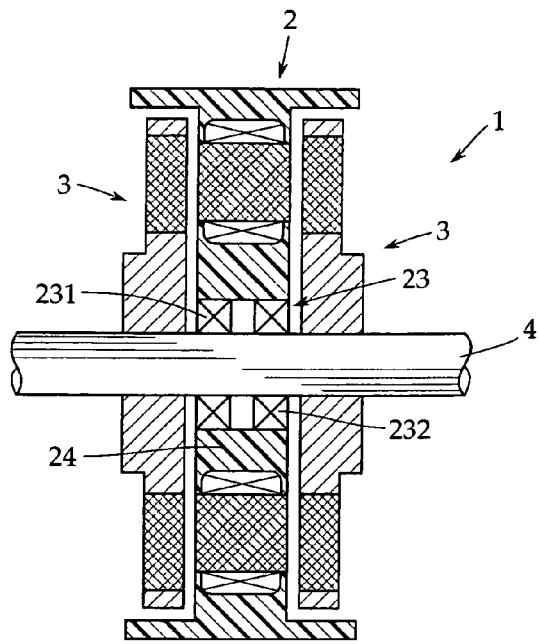
FIG. 1 is a sectional view schematically showing an internal construction of an axial air-gap electronic motor in accordance with one embodiment of the present invention.
Figure 2:
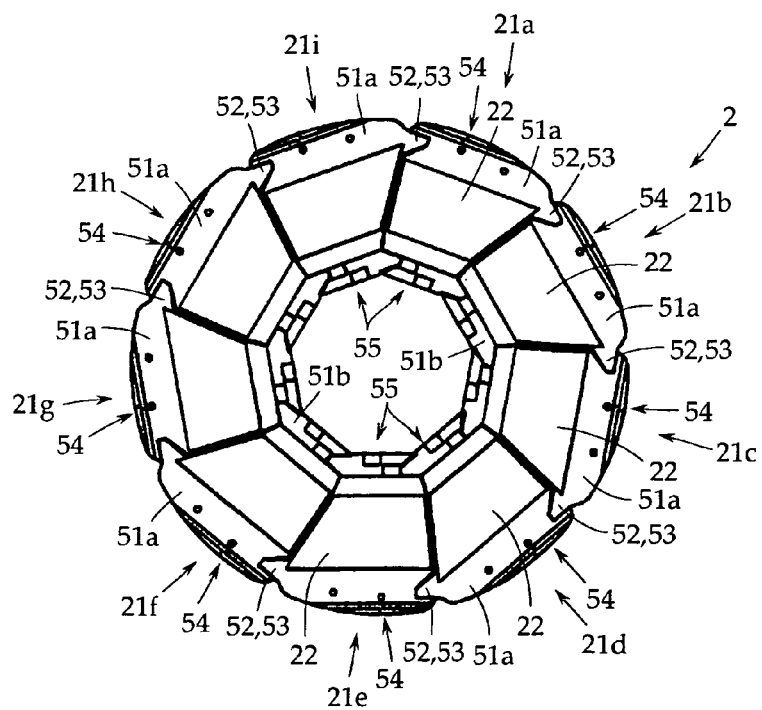
FIG. 2 is a front view of a stator of the axial air-gap electronic motor shown in FIG. 1.

An embodiment of the present invention will now be described with reference to the accompanying drawings. The present invention is not limited to this embodiment. FIG. 1 is a sectional view schematically showing an internal construction of an axial air-gap electronic motor in accordance with one embodiment of the present invention, and FIG. 2 is a front view of a stator.

This axial air-gap electronic motor 1 includes a stator 2 formed into a disc shape and a pair of rotors 3 arranged oppositely on both side surfaces of the stator 2 with a predetermined gap being provided therebetween. Each of the rotors 3 is fixed coaxially to a rotor output shaft 4 that delivers a rotational driving force.

The stator 2 and the rotors 3 are housed in a bracket, not shown. In this example, the outer peripheral surface of the stator 2 is also used as the outer peripheral wall of the bracket, and a lid member, not shown, is installed at both ends thereof. The rotors 3 may be installed directly to a fan etc. without the use of the lid member.

Although the rotors 3 are arranged on both, right and left, sides with the stator 2 being held therebetween in this embodiment, the rotor 3 may be arranged on either one side only. In the present invention, the rotor 3 can be configured so as to merely have a function necessary for constituting the axial air-gap electronic motor 1, and the configuration of the rotor 3 can be changed arbitrarily according to the specifications.

Also, although the rotors 3 commonly have the same rotor output shaft 4, a two output shaft type, in which each of the rotors 3 has an individual rotor output shaft, may be employed. Further, a shaft-less type, in which the rotors 3 are supported directly on the stator 2 via a radial ball bearing without the use of the rotor output shaft 4, may also be employed.

As shown in FIG. 2, the stator 2 includes a plurality of (nine (nine slots) in this example) of core members 21a to 21i that are arranged in a ring form with the rotation axis line of the rotor output shaft 4 being a center axis. Since the core members 21a to 21i have the same construction, in this example, explanation is given by taking the core member 21a as an example.

In a central portion of the stator 2, a bearing portion 23 is arranged. In this example, the bearing portion 23 has a pair of radial ball bearings 231 and 232, and the inner race thereof is press fitted to the rotor output shaft 4, and the outer race side is embedded in a synthetic resin material 24. In the present invention, the construction of the bearing portion 23 may be arbitrary.

Figure 3A:
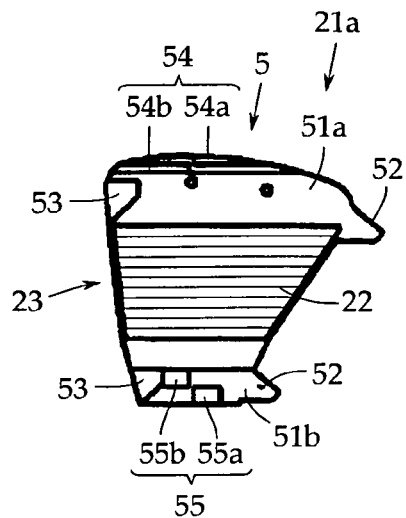
FIG. 3A is a front view of a core member for the stator shown in FIG. 2.
Figure 3B:
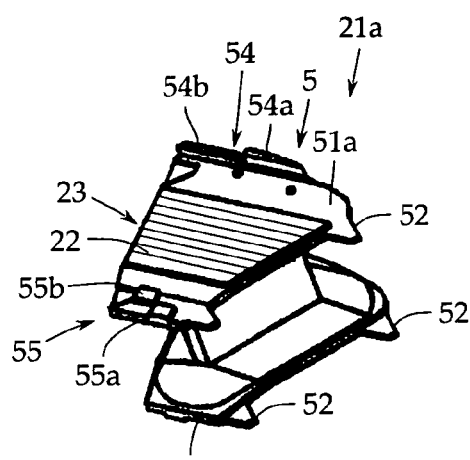
FIG. 3B is a perspective view thereof.

As shown in FIGS. 3A and 3B, the core member 21a is formed by winding a coil 24 (refer to FIG. 4) on a bobbin-shaped stator iron core 23 having a pair of, right and left, flange-shaped teeth surfaces 22. The stator iron core 23 is formed by laminating magnetic steel sheets formed into an H shape along the radial direction.

The whole of the stator iron core 23 is covered by an insulator 5 formed of an insulating resin with the teeth surfaces 22 being left. The insulator 5 has flange portions 51a and 51b extending in the radial direction along the teeth surfaces 22, and the flange portions 51a and 51b also form a part of a bobbin on which the coil 24 is wound.

Each of the flange portions 51a and 51b is provided with two connecting means for connecting the core members 21a to 21i in a different mode. First, as a first connecting means, in an end portion in the circumferential direction of the flange portion 51a, 51b, a locking convex portion 52 for connecting the core members 21a to 21i in a ring form with the axis line of the rotor output shaft 4 being a center and a locking concave portion 53 for locking the locking convex portion 52 are provided.

The locking convex portion 52 is provided so as to project from one end portion (right-hand side surface in FIG. 3A) of the flange portion 51a, 51b toward the outside. In this example, the locking convex portion 52 consists of a tongue element formed into a triangular shape. By contrast, the locking concave portion 53 consists of a notch portion formed so as to be directed from the other end portion (left-hand side surface in FIG. 3A) of the flange portion 51a, 51b toward the inside, and is formed as a triangularly shaped groove engaging with the locking convex portion 52.

Although the locking convex portion 52 and the locking concave portion 53 are formed into a triangular shape in this example, the shapes of the locking convex portion 52 and the locking concave portion 53 can be changed to an arbitrary shape such as square or semicircular according to the specifications if the shapes are such that the core members 21a to 21i can be connected in a ring form.

According to this connecting means, by engaging the locking convex portion 52 and the locking concave portion 53 with each other, the core members 21a to 21i can be connected in a ring form with the axis line of the rotor output shaft 4 being a center Next, as a second connecting means, the flange portions 51a and 51b are provided with locking ribs 54 and 55 for connecting the core members 21a to 21i in a one-row rod form, respectively. In the description below, the flange portion 51a on the upper side in FIG. 3A is called an upper flange portion, and the flange portion 51b on the lower side is called a lower flange portion.

The locking rib 54 formed in the upper flange portion 51a has a pair of rib members (rib pair) 54a and 54b arranged along the upper end side of the upper flange portion 51a, and the rib members 54a and 54b are arranged in a state of being relatively shifted in the circumferential direction and the radial direction of the stator 2 in the upper flange portion 51a.

Figure 5:
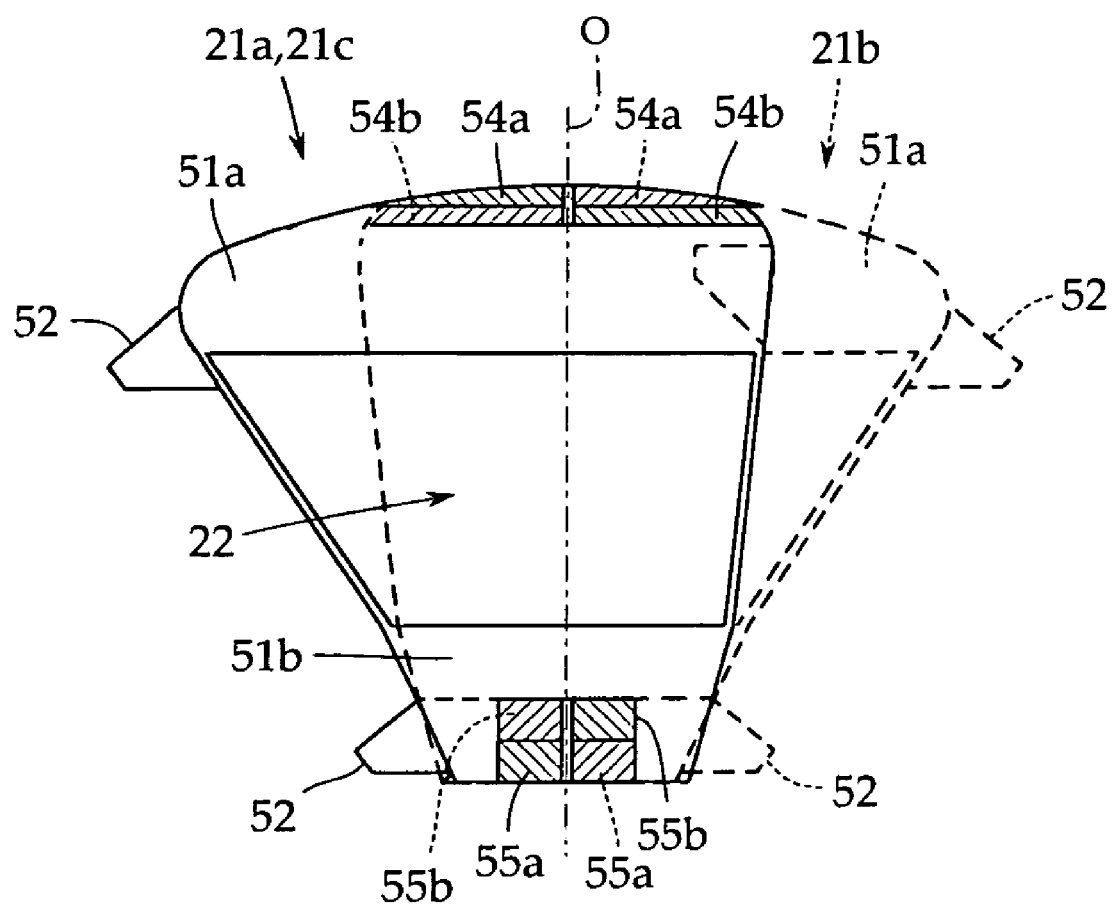
FIG. 5 is a partially sectional view showing a state in which the core members are lapped on each other.

According to this connecting means, as shown in FIG. 5, when the core members 21a to 21i are laminated along the axial direction, the rib members 54a and 54b of the adjacent core members 21a to 21i engage with each other, by which the core members 21a to 21i can be connected in a rod form.

Also, the rib member 54a, 54b is provided so as to have an axial symmetry shape with respect to a centerline O (refer to FIG. 5) in the radial direction so that the upper flange portions 51a can be lappingly engaged with each other. In this example, the rib member 54a of the upper flange portion 51a on the upper side (solid line in FIG. 5) is arranged at the upper left and the rib member 54*b* at the lower right, and the rib member 54*a* of the upper flange portion 51*a* on the lower side (chain line in FIG. 5) is arranged at the upper right and the rib member 54*b* at the lower left.

In FIG. 5, the core members 21*a* to 21*i* are connected to each other in an inverted state (refer to FIG. 7A) so that the adjacent core members 21*a* to 21*i* have a different pole. However, the core member is configured so that even if the core members 21*a* to 21*i* are connected to each other without being turned round, the rib members 54*a*, 54*b* engage with each other.

The locking rib 55 formed in the lower flange portion 51*b* similarly has a pair of rib members (rib pair) 55*a* and 55*b* arranged along the lower end side of the lower flange portion 51*b*, and the rib members 55*a* and 55*b* are arranged in a state of being relatively shifted in the circumferential direction and the radial direction of the stator 2 in the upper flange portion 51*a*.

Also, the rib member 55*a*, 55*b* is provided so as to have an axial symmetry shape with respect to the centerline O in the radial direction so that the lower flange portions 51*b* can be lappingly engaged with each other. In this example, the rib member 55*a* of the lower flange portion 51*b* on the upper side (solid line in FIG. 5) is arranged at the lower left and the rib member 55*b* at the upper right, and the rib member 55*a* of the lower flange portion 51*b* on the lower side (chain line in FIG. 5) is arranged at the lower right and the rib member 55*b* at the upper left.

The core member is configured so that even if the core members 21*a* to 21*i* are connected to each other without being turned round, like the rib members 54*a*, 54*b* on the other side, the rib members 55*a*, 55*b* engage with each other so that the core members 21*a* to 21*i* can be connected in a rod form.

This second connecting means is used when the coil 24 is wound on the core members 21*a* to 21*i*. In this example, the coil 24 is wound on the core members 21*a* to 21*i* by dividing the core members 21*a* to 21*i* for three phases of U phase, V phase, and W phase.

In this example, on the teeth surface 22 of the stator iron core 23 of the core member 21*a* to 21*i*, a predetermined angle shift is formed between the end portion of the insulator 5 formed at both ends of teeth and both end portions of the lower flange portion 51*b* to reduce cogging torque produced at the time of rotation of the rotors 3.

According to this configuration, in the case where the insulator 5 is formed extendingly without the angle shift in the end portion of teeth, the area of the lower flange portion 51*b* decreases, and thus the strength lowers. Therefore, by providing the angle shift, the area of the lower flange portion 51*b* can be increased, and thereby the strength and the area that forms the rib pair 55*a* and 55*b* can be secured. Although a skew is formed in the core member 21*a* to 21*i* in this example, in the present invention, the skew is an arbitrary component, and the skew is not necessarily needed.

Also, in this example, the core members 21*a* to 21*i* are configured so as to be connected to each other by engaging them with each other using the rib pairs 54 and 55 as the connecting means. However, a connecting means other than the above described means may be used to connect the core members 21*a* to 21*i*.

Other connecting means are explained with reference to FIGS. 9A to 9E. In each of FIGS. 9A to 9E, the left-hand side indicates a flange portion of one of the same core member, and the right-hand side indicates a flange portion of the other.

As shown in FIG. 9A, the connecting means may be such that convex portions 7*a* are provided in the upper flange portion 51*a* and the lower flange portion 51*b* of one side, and concave portions 7*b* that mate with the convex portions 7*a* are provided in the upper flange portion 51*a* and the lower flange portion 51*b* on the other side, by which the core members are engaged with each other.

At this time, as shown in FIG. 9B, the connecting means may be such that the convex portion 7*a* is provided in the upper flange portion 51*a* on one side and the concave portion 7*b* is provided on the lower flange portion 51*b*, and the concave portion 7*b* corresponding to the convex portion 7*a* is provided in the upper flange portion 51*a* on the other side and the convex portion 7*a* corresponding to the concave portion 7*b* is provided in the lower flange portion 51*b*, namely, the convex portion 7*a* and the concave portion 7*b* are provided alternately. These core members can be connected by being turned round by changing the upside and the downside.

Further, as shown in FIG. 9C, the connecting means may be such that ribs 7*c* erected in a triangular shape are provided in the flange portions 51*a* and 51*b* on one side, and ribs 7*d* formed in axial symmetry with respect to the centerline O in the radial direction are provided in the flange portions 51*a* and 51*b* on the other side, by which the core members are engaged with each other. These core members can be connected by merely being turned round.

Also, as shown in FIG. 9D, the connecting means may be such that a straight line shaped rib 7*e*1 is provided in the upper flange portion 51*a* on one side and a straight line shaped rib 7*e*2 is also provided in the lower flange portion 51*b*, and a rib 7*f*1 abutting on the inside of the rib 7*e*1 is provided in the flange portion 51*a* on the other side and a rib 7*f*2 abutting on the rib 7*e*2 is provided in the lower flange portion 51*b*, by which the core members are locked to each other. These core members can be connected by being turned round by changing the upside and the downside.

Also, for example, as shown in FIG. 9E, the connecting means may be such that a U-shaped rib 7*g* is provided in the lower flange portion 51*b* on one side, and a rib 7*h* locked to the U-shaped rib 7*g* is provided in the lower flange portion 51*b* on the other side, by which the core members are engaged with each other. Needless to say, these ribs may be provided on the upper flange portion 51*a* side.

Furthermore, as another mode of connecting means, as shown in FIG. 10, a locking claw 8*a* may be provided on the upper flange portion 51*a* side on either one side and a locking claw 8*b* may be provided on the lower flange portion 51*b* side so that the adjacent upper flange portion 51*a* and lower flange portion 51*b* on the other side are locked and connected by these locking claws 8*a* and 8*b*.

Figure 10A:
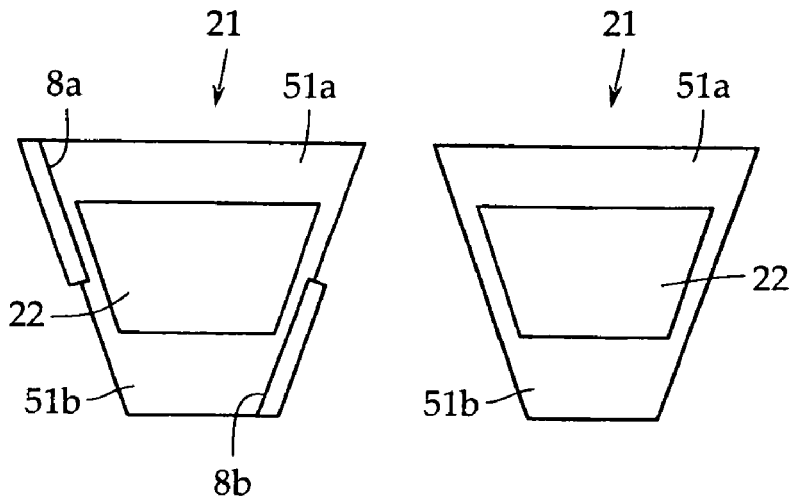
FIGS. 10A to 10C are schematic views showing other modifications of connecting means.
Figure 10B:
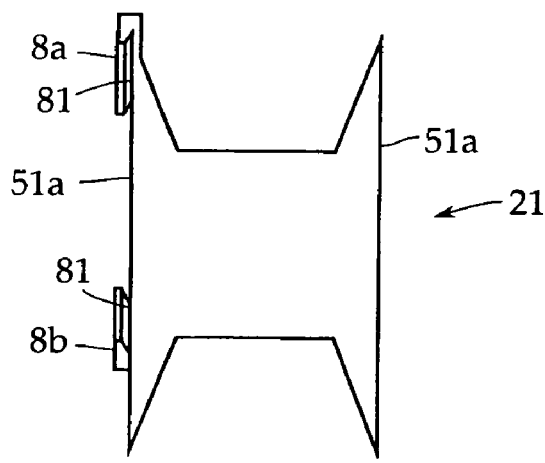
Figure 10C:
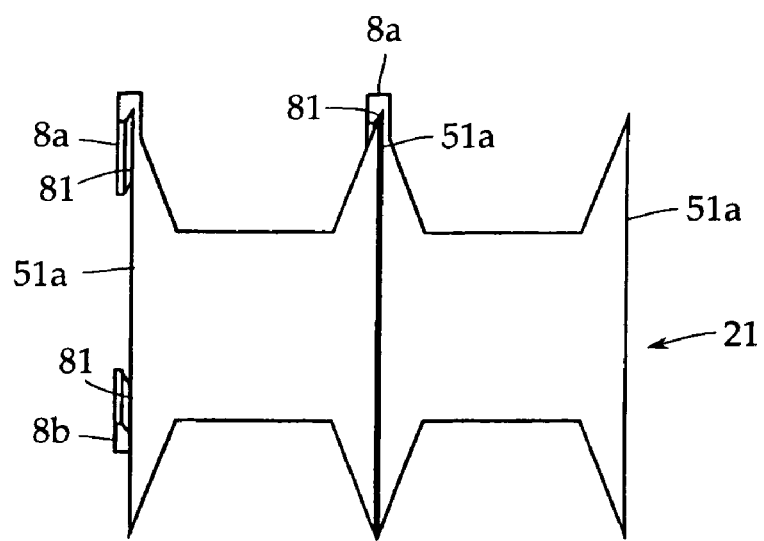

FIG. 10A is front and back views of a core member 21, FIG. 10B is a plan view showing a state in which the core member 21 is viewed from the upside, and FIG. 10C is a plan view showing a state in which the core members are connected to each other.

As shown in FIGS. 10A and 10B, one locking claw 8*a* is provided on one side surface of the upper flange portion 51*a*, and the other locking claw 8*b* is provided on the side surface on the opposite side of the lower flange portion 51*b*. On the inside of the locking claws 8*a* and 8*b*, support grooves 81 are formed to support the end portions of the opposed flange portions 51*a* and 51*b* by holding them therebetween.

According to this connecting means, as shown in FIG. 10C, the mating core member 21 (left-hand side) that is connected to the core member 21 (right-hand side) provided with the locking claws 8*a* and 8*b* is inserted from the outer periphery side (front side of paper) of the core member 21, by which the flange portions 51*a* and 51*b* are held along the locking groove 81 so that the core members 21, 21 can be connected to each other. Also, since the locking claws 8*a* and 8*b* project to the left and right, the locking claws 8a and 8b can also be used as a ring-shaped connecting means for the core members 21a to 21c in the case where the core members are arranged in a ring form.

Next, one example of an assembling procedure for the axial air-gap electronic motor 1 in accordance with the present invention is explained with reference to FIGS. 6A to 6D and FIGS. 7A to 7D. First, the core members 21a to 21i for nine slots are prepared, and these core members are divided into three phases of U phase, V phase, and W phase.

Since the assembling procedure and winding work for each phase are the same, in the explanation below, only three core members 21a to 21c constituting U phase are explained, and the explanation of the remaining V phase and W phase is omitted.

First, the core members 21a to 21c are connected in a one-row rod form so that the teeth surfaces 22 face to each other. In connecting the core members 21a to 21c, the middle core member 21b is taken as a reference position, and the core members 21a and 21c on both sides are installed to the core member 21b by being turned round around the radial axis line (refer to FIG. 7A).

At this time, as shown in FIG. 5, the locking ribs 54 and 55 formed on the side surfaces of the flange portions 51 of the core members 21a to 21c are engaged with each other, by which the core members 21a to 21c can be connected to each other along the axial direction (connecting step).

Figure 6A:
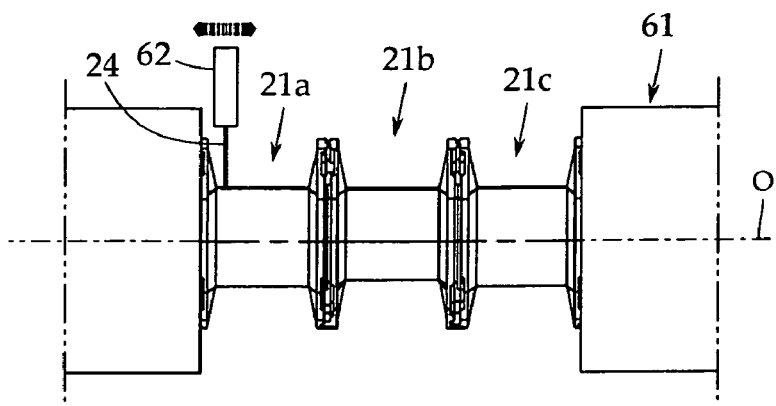
FIGS. 6A to 6D are explanatory views for illustrating steps for winding a coil on the core member.
Figure 6B:
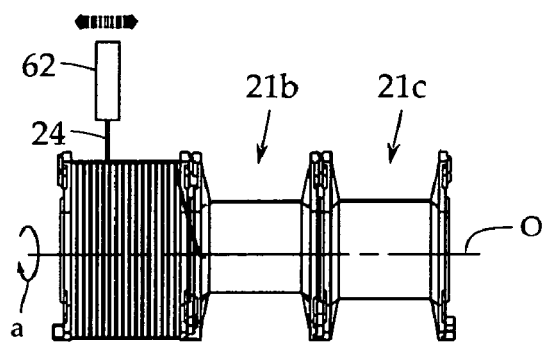

Next, as shown in FIG. 6A, the core members 21a to 21c connected to a rod form are set on a wire winding device. The wire winding device is controlled by a control means, not shown, and is provided with clamps 61 for holding the core members 21a to 21c therebetween and a nozzle 62 for sending out the coil 24.

The connecting means is not provided on the core member 21a to 21c side, and may be provided on the clamps 61, described later. Specifically, for example, a magnetic force generating means may be provided on the clamps 61 so that the teeth surfaces 22 of the core members 21a to 21c are connected to each other by a magnetic force.

The clamps 61 can be rotated around the axis line O by a rotational driving means, not shown, and also incorporate a supporting mechanism for supporting the core members 21a to 21c by holding them therebetween. The nozzle 62 is provided so that the tip end of the nozzle 62 can be moved to the right and left along the axis line O by a nozzle moving means, not shown, and lets out the coil 24 from the tip end thereof.

First, the core members 21a to 21c are set between the clamps 61, and the core members 21a to 21c are held between the clamps 61 and are fixed. After the core members 21a to 21c have been fixed, the worker pulls out the tip end of the coil 24 (wire for coil, such as copper wire) from the tip end of the nozzle 62, and temporarily fixes the coil 24 by hooking it to a part (for example, the locking convex portion 52) etc. of the flange portion 51 of the core member 21a. By doing this, the preparation for wire winding work is finished. The coil 24 may be held by the clamp 61 side, not by the core member 21a side.

In this state, when a start button, not shown, is pressed, the control means gives a command to the clamp portion 61, and the clamps 61 that have received the command begin to rotate in a fixed direction (in the direction of arrow a in FIG. 6B) along the axis line O.

At the same time the clamps 61 are rotated, the coil 24 is wound on the outer peripheral surface of the core member 21a. At this time, the control means also gives a command to the moving means of the nozzle 62, and the nozzle 62 moves to the right and left reciprocatingly on the outer peripheral surface of the core member 21a. Thereby, the coil 24 is wound evenly on the outer peripheral surface of the core member 21a.

After a predetermined amount of the coil 24 has been wound on the core member 21a, the control section stops the rotational driving means once, and moves the nozzle 62 to the adjacent core member 21b. At this time, the coil 24 goes to the core member 21b without being cut.

Figure 6C:
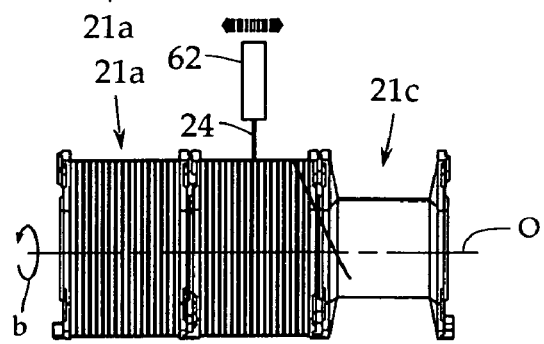

After the movement of the nozzle 62 has been confirmed, the control means gives a command again to the rotational driving means to rotate the clamps 61 in the reverse direction (in the direction of arrow b in FIG. 6C). When the rotation of the core member 21b starts, the coil 24 is wound on the core member 21b in the direction reverse to the coil 24 on the core member 21a. The nozzle 62 similarly moves reciprocatingly on the core member 21b, and the coil 24 is wound evenly on the core member 21b.

A transition wire between the core member 21a and the core member 21b is restrained by the coil, so that the transition wire does not come loose even at the time of reverse rotation. Even if the transition wire shifts, it is hooked to the locking convex portion 52 projecting from the flange portion 51, by which the coil 24 wound on the core member 21a is prevented from being loosened by the reverse rotation.

After the coil 24 has been wound on the core member 21b, the control means stops the rotational driving means again, and moves the nozzle 62 to the adjacent core member 21c. At this time as well, the coil 24 goes to the core member 21c while being connected without being cut.

Figure 6D:
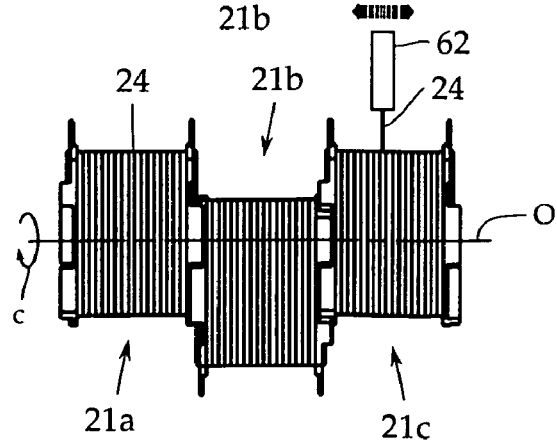

When the nozzle 62 moves to the core member 21c, the control means gives a command to the rotational driving means, and the rotational driving means that has received the command begins the rotation in the same direction as the direction in which the coil 24 is wound on the core member 21a (in the direction of arrow c in FIG. 6D).

Thereby, the coil 24 begins to be wound on the outer peripheral surface of the core member 21c, and the coil 24 is wound evenly on the core member 21c by the transverse reciprocating movement of the nozzle 62.

Finally, after a predetermined amount of the coil 24 has been wound on the core member 21c, the control means stops the rotational driving means, and returns the nozzle 62 to its initial position, by which all of the wire winding work is finished (winding step). The coil 24 may be cut automatically or manually.

Figure 7A:
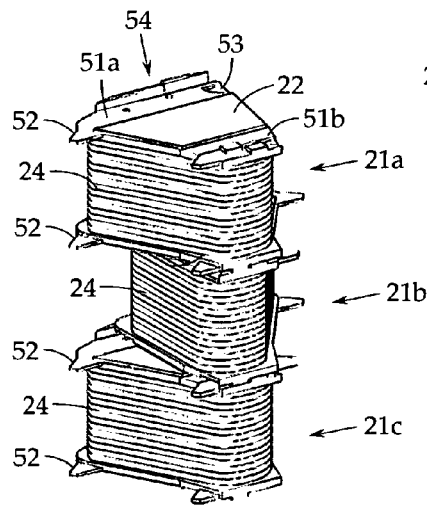
FIGS. 7A to 7D are explanatory views for illustrating steps for assembling the core members on which the coil is wound.
Figure 7B:
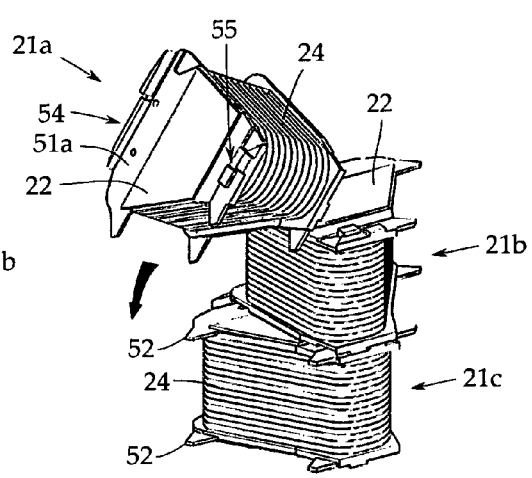

After the winding work for winding the coil 24 has been finished, the core members 21a to 21c are removed from the wire winding device, and the procedure goes to the next assembling step. In this step, first, the core members 21a to 21c are placed, for example, in an upright state as shown in FIG. 7A. One core member 21a is turned 180□ with the left side surface in FIG. 7B being an axis by making the middle core member 21b a reference, and the locking convex portion 52 of the core member 21a is engaged with the locking concave portion 53 of the core member 21b. Thereby, as shown in FIG. 7C, the core member 21a is connected to the left side surface of the core member 21b.

Figure 7C:
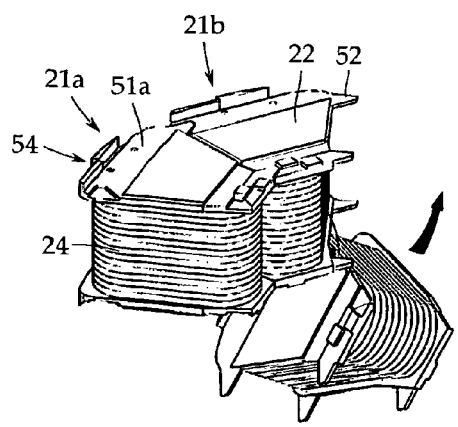
Figure 7D:
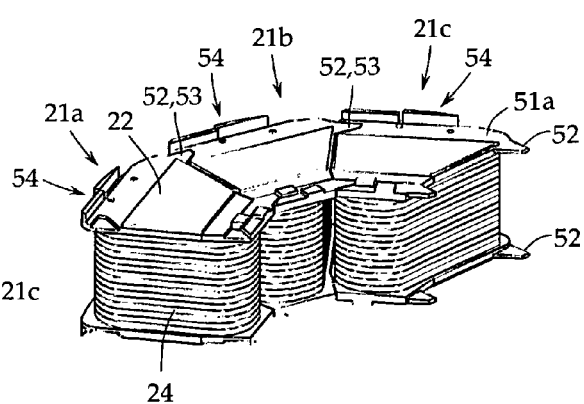

Next, the core member 21c is turned 180□ with the right side surface in FIG. 7C being an axis, and the locking convex portion 52 of the core member 21b is engaged with the locking concave portion 53 of the core member 21c. Thereby, as shown in FIG. 7D, the core members 21a to 21c are connected to each other in a fan shape on the same plane.

Figure 4:
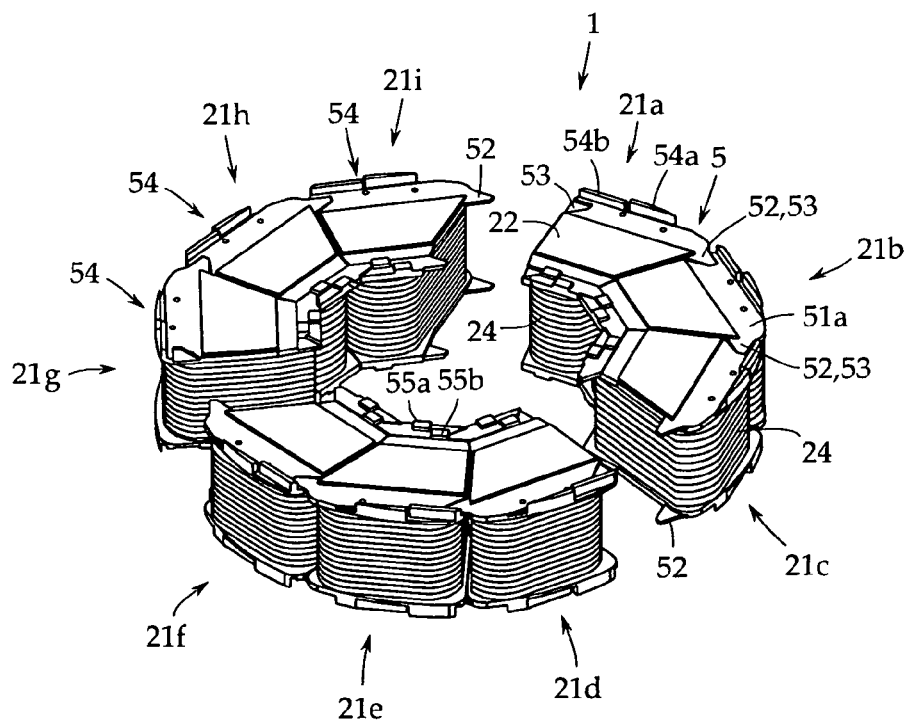
FIG. 4 is an exploded perspective view showing a state in which the stator shown in FIG. 2 is divided into each phase.

The above-described winding step and assembling step are repeated, by which the remaining core members 21d to 21i of V phase and W phase are assembled, and thereafter three parts are connected as shown in FIG. 4. Finally, the core members 21a to 21i are connected in a ring form, and thereafter the core members 21a to 21i are hardened integrally using a resin by means of insert molding, by which the stator 2 is completed.

Furthermore, in this example, in a state in which the stator iron core 21 and the insulator 5 are integrated, the coil 24 is wound. However, the configuration may be such that only the insulator 5 is assembled in advance, and after the coil 24 has been wound on the assembled insulator 5, the stator iron core 21 is inserted.

Figure 11:
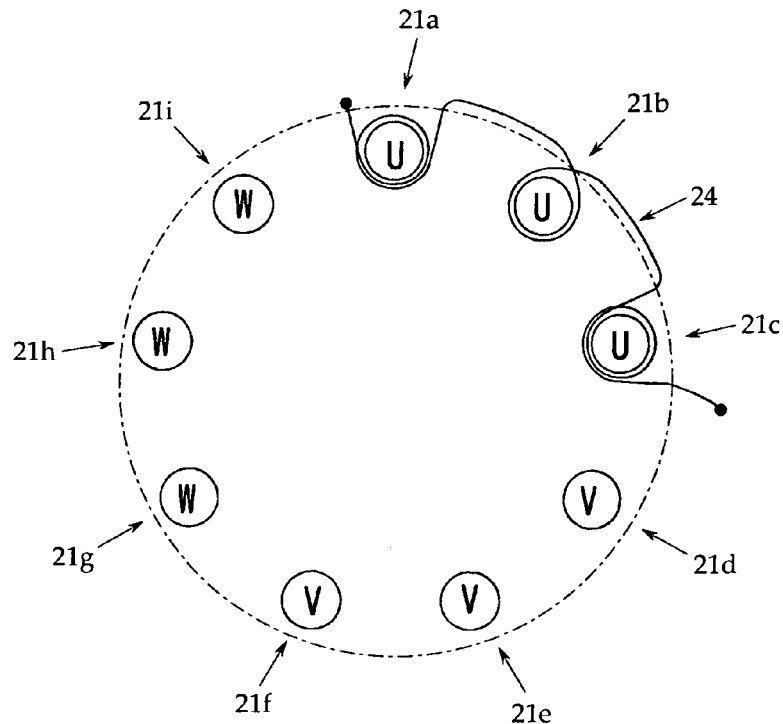
FIG. 11 is an arrangement view of a winding of a stator having a slot combination of 2n:3n.

According to this configuration, as shown in FIG. 11, the coil 24 can be wound on the three core members 21a to 21c of each phase by one turn. Further, since the middle core member 21b is installed in the reverse direction to the core members 21a and 21c on both sides, the coil 24 of the core member 21b can be wound in the reverse direction.

In the above-described embodiment, the core members 21a to 21i are formed so that three core members 21a to 21c, 21d to 21f, and 21g to 21i in which the slot combination of rotor and stator is 8:9 (2n:3n (n is a positive integer)) and the core members are separated into U phase, V phase, and W phase are connected in a ring form in the order of U→U→U→V→V→V→W→W→W in the clockwise direction. However, the slot combination of 6:9 also includes a mode described below.

Figure 12:
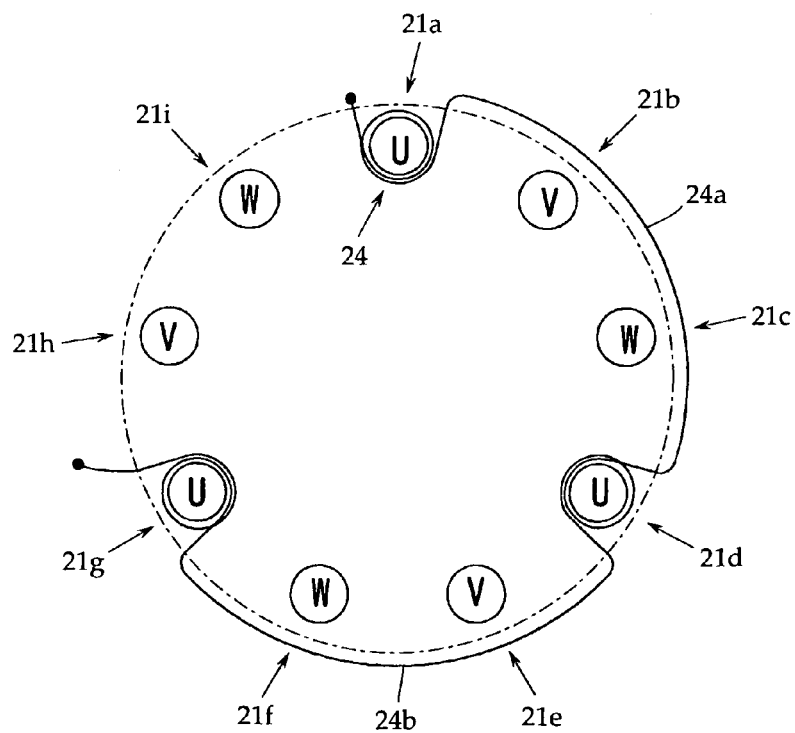
FIG. 12 is an arrangement view of a winding of another mode having a slot combination of 2n:3n.

As shown in FIG. 12, for this core member 21a to 21i, the U phase, V phase, and W phase are arranged in a ring form in the order of U→V→W→U→V→W→U→V→W in the clockwise direction, and the core members 21a to 21i corresponding to each phase are arranged in a form of stepping stones. In this example, the coil members of U phase are 21a, 21d, and 21g, the coil members of V phase are 21b, 21e, and 21h, and the coil members of W phase are 21c, 21f, and 21i.

Since the configuration of the core member of each phase is the same, in the description below, explanation is given by taking the core members 21a, 21d, and 21g of U phase as an example. The coil 24 is wound on the core members 21a, 21d, and 21g, and transition wires 24a and 24b are pulled out between the core members 21a, 21d, and 21g.

Figure 13:
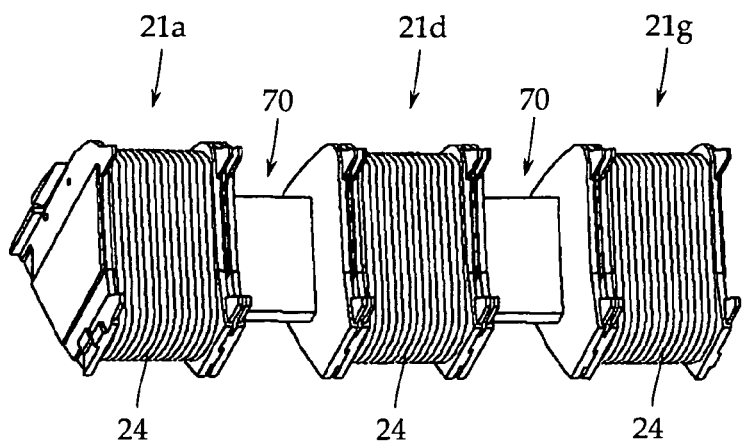
FIG. 13 is a schematic view showing a state in which a dummy member is interposed between the core members.
Figure 14:
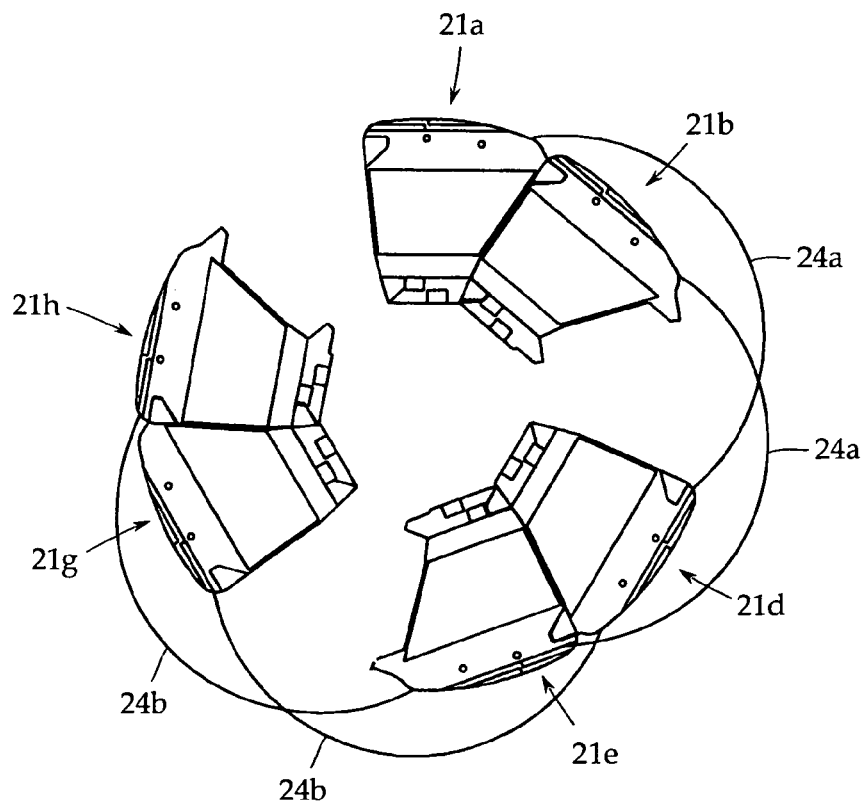
FIG. 14 is an explanatory view for illustrating an assembling procedure for the core member.

As shown in FIGS. 13 and 14, the transition wires 24a and 24b are formed by interposing dummy members 70 between the core members 21a, 21d, and 21g when the coil 24 is wound.

The dummy member 70 is formed into the same shape as that of each of the core members 21a to 21i, and is arranged so that the teeth surfaces 22 of the core members 21a to 21i face to each other. The dummy member 70 is also provided with the above-described connecting means so as to be capable of being connected to the core members 21a to 21i.

According to this configuration, the control means winds the coil 24 on the core members 21a, 21d, and 21g while a series of the above-described wire winding work is moved from one end to the other end. In the dummy member 70 between the core members 21a, 21d, and 21g, the coil 24 of a length necessary for the transition wire 24a, 24b is wound, by which the winding processing of the coil 24 and the transition wire processing can be performed at a time.

Figure 15:
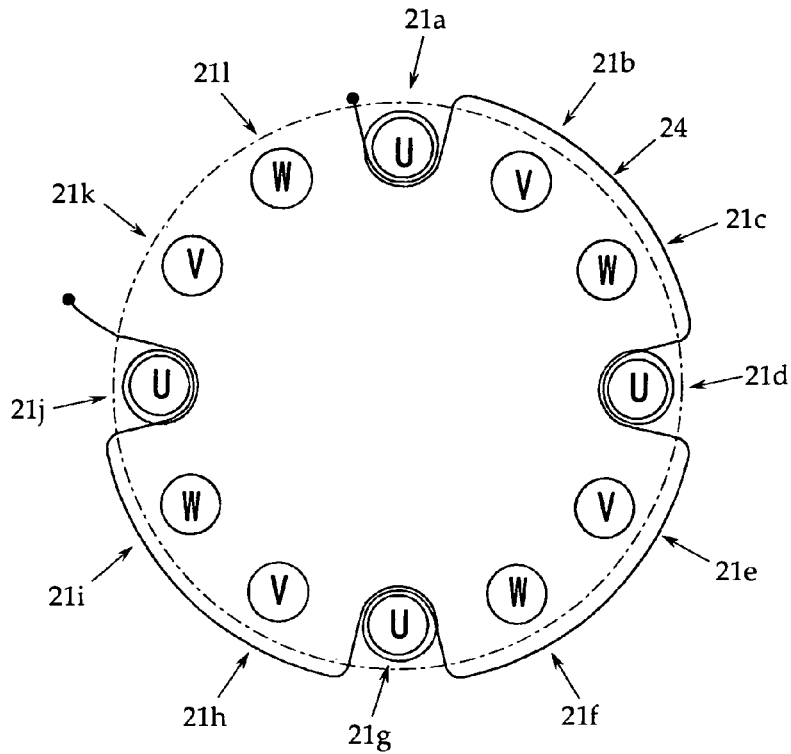
FIG. 15 is an arrangement view of a winding of a stator of 2n:3n (12 slots)

In this example, the dummy member 70 has been explained by taking the slot combination of nine slots as an example. However, as shown in FIG. 15, the dummy members 70 can be used for the 12-slot type. Specifically, in the case where the slot combination is 2n:3n, this configuration can be applied to all patterns if the dummy member 70 is interposed every other core member.

Figure 16:
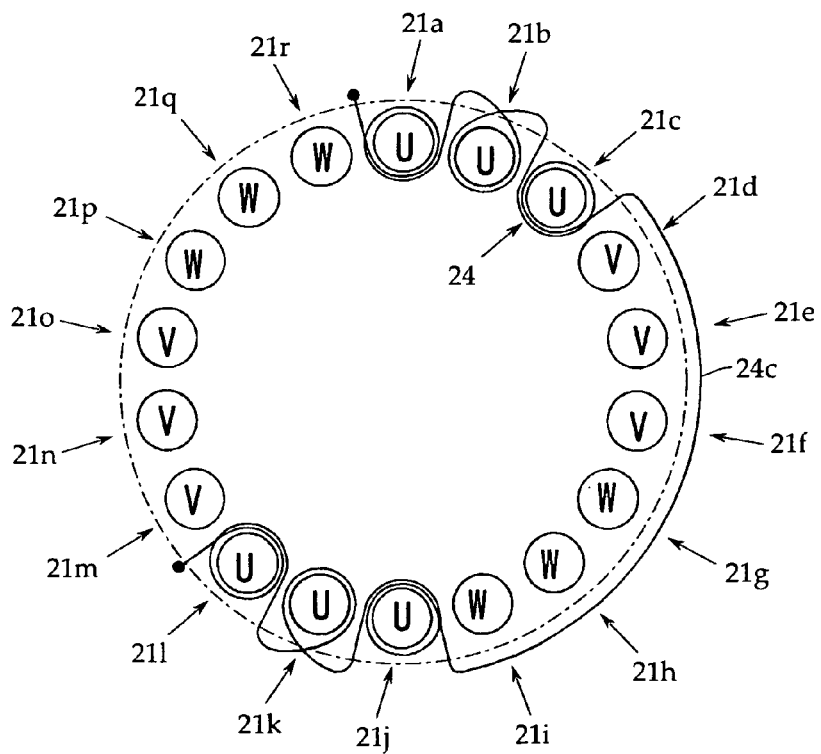
FIG. 16 is an arrangement view of a winding of a stator of 8n:9n or 10n:9n (18 slots)

Also, as another mode, FIG. 16 shows an arrangement of winding of 18-slot stator. This stator has a slot combination of 8n:9n or 10n:9n (n is a positive integer), and eighteen core members 21a to 21r are arranged in the order of U→U→U→V→V→V→W→W→W→U→U→U→V→V→V→W→W→W.

Figure 17:
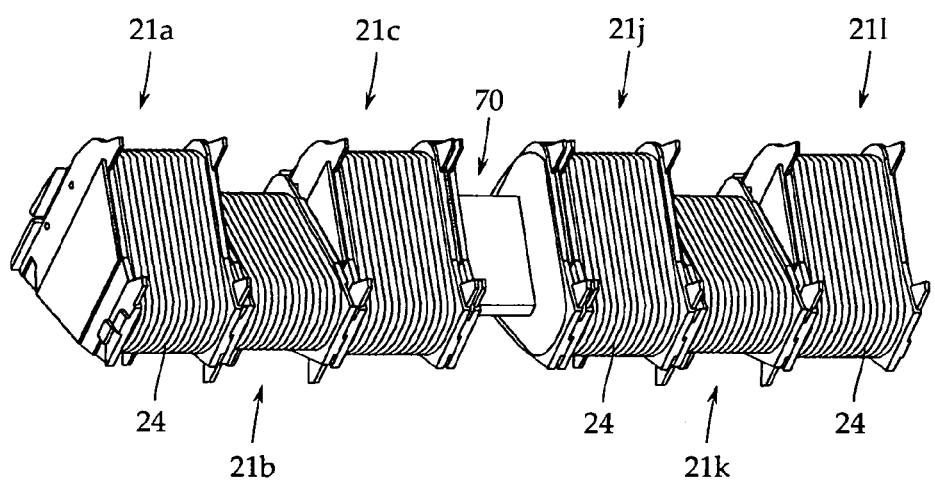
FIG. 17 is a perspective view showing an arrangement state of the dummy member in the case of 18 slots.

In such a case, as shown in FIG. 17, six core members 21a to 21c and 21j to 21l are formed into two groups each having three core members, and the dummy member 70 is interposed therebetween, by which a transition wire 24c can be formed.

Figure 8:
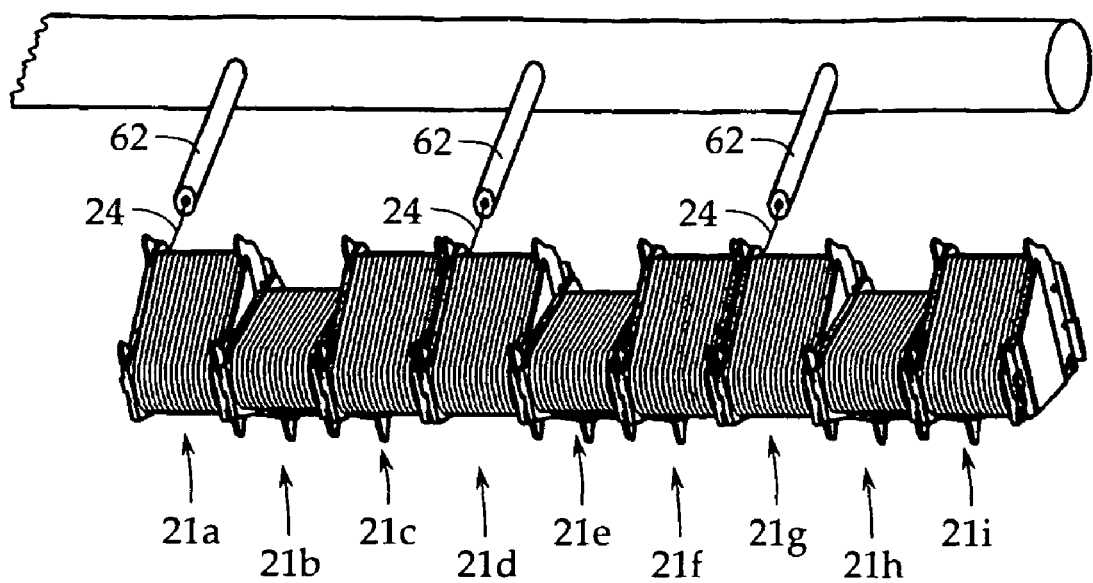
FIG. 8 is a schematic view schematically showing a method for joining all of the core members and winding the coil.

In this example, for the core members 21a to 21i (21a to 21r), wire winding work is performed by making three core members of each phase one group. However, for example, as shown in FIG. 8, the configuration may be such that all core members 21a to 21i are arranged in series in a form of making three core members one group, and the coil 24 is wound from one end side to the other end side.

In this example, the nozzle 62 for the coil 24 is provided at three places. However, the configuration may be such that after the coil 24 has been wound on all of the core members 21a to 21i by the nozzle 62 at one place, the coil 24 is cut into each phase.

Figure 18:
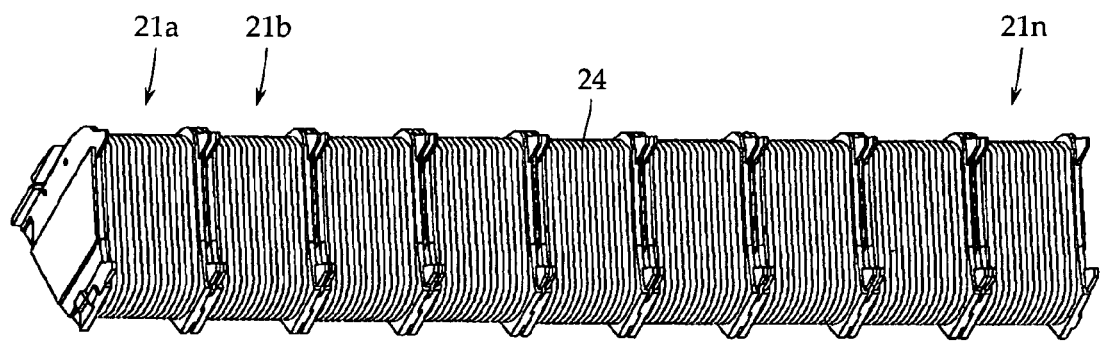
FIG. 18 is a perspective view showing a modification of a winding procedure for the core member.

Furthermore, as shown in FIG. 18, the configuration may be such that a necessary number of core members (21a, 21b, ..., 21n) are arranged on a straight line according to the slot combination, and the coil 24 is wound from one end toward the other end. In this case, after the core members 21a to 21n have been cut and separated from each other, the separated core members are assembled in a ring form, and a transition wire may be connected for each phase. According to this configuration, the core members 21a to 21n can be manufactured at a very low cost.

Figure 19:
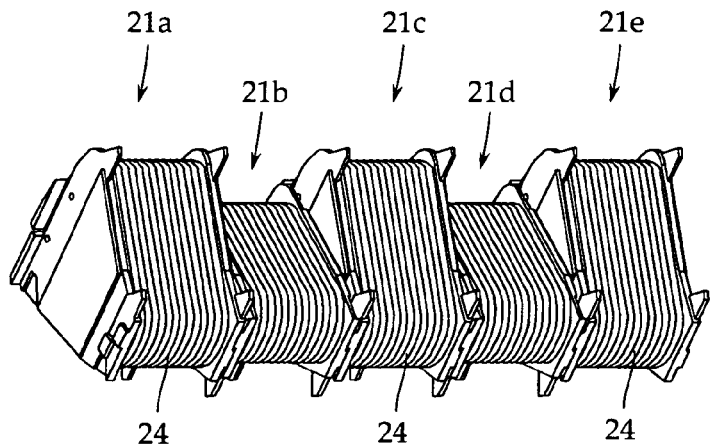
FIG. 19 is a perspective view showing an arrangement state of the core members of the stator of 15 slots.
Figure 20:
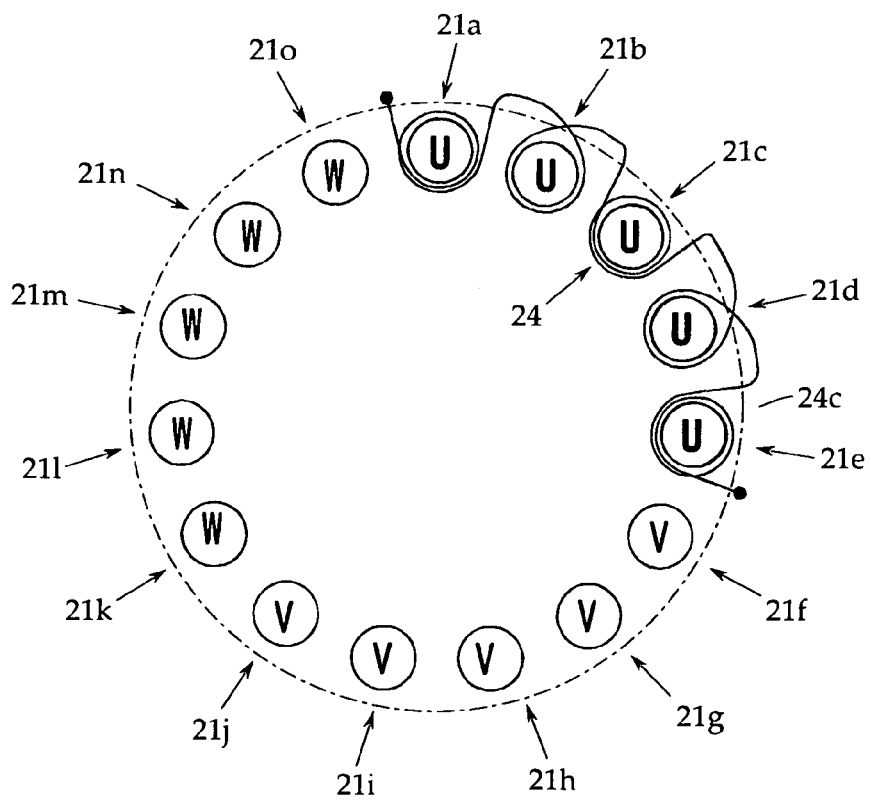
FIG. 20 is an arrangement view of a winding of a stator of 15 slots.

Also, as shown in FIGS. 19 and 20, in the case of fifteen slots, fifteen core members 21a to 21o are divided into three groups each having five core members, and these core members may be connected on a straight line to perform the wire winding work.

In the above-described embodiment, the dummy member 70 is used to form the transition wire. However, for example, in FIG. 13, the dummy member 70 is not used, and after an excess coil of a length corresponding to the transition wire has been wound on the core member 21a and the core member 21d, the coil of a length corresponding to the transition wire may be loosened and assigned to the transition wire.

The present application is based on, and claims priority from, Japanese Applications Serial Number JP2005-016076, filed Jan. 24, 2005, and JP2005-220627, filed Jul. 29, 2005 the disclosure of which is hereby incorporated by reference herein in its entirety.

While the invention has been explained with reference to the specific embodiments of the invention, the explanation is illustrative and the invention is limited only by the appended claims.

What is claimed is:

1. A method for manufacturing an axial air-gap electronic motor, comprising:
   preparing a plurality of core member and a plurality of dummy members, each of said dummy members having a shape same as that of the core member,
   arranging the plurality of core members such that teeth surfaces of the core members face each other,
   arranging the dummy member between predetermined core members, and
   winding a coil from one end side toward the other end side of the core members through the core member continuously without cutting,
   wherein a part of the coil corresponding to a transition wire set between the core members is wound on the dummy member.

2. The method for manufacturing an axial air-gap electronic motor according to claim 1, wherein each of the core members is formed to have locking ribs on flanges thereof so that the locking ribs engage each other when the flanges of the core members abut against each other.

3. The method for manufacturing an axial air-gap electronic motor according to claim 2, wherein each of the dummy members is formed to have locking ribs cm flanges thereof so that the locking ribs of the dummy member engage the locking ribs of the core members when the flanges of the dummy member and the core members abut against each other.

4. The method for manufacturing an axial air-gap electronic motor according to claim 3, wherein the core members and the dummy members are arranged side by side to engage together.

5. The method for manufacturing an axial air-gap electronic motor according to claim 1, wherein in case where a slot combination of a rotor and a stator is 2n:3n (n is a positive integer), the dummy member is interposed in every other core member.

6. The method for manufacturing an axial air-gap electronic motor according to claim 1, wherein in case where a slot combination of a rotor and a stator is 8n:9n or 10n:9n (n is a positive integer), the dummy member is interposed in every third core member.

* * * * *